United States Patent

Krambeck et al.

[11] Patent Number: 4,481,103
[45] Date of Patent: Nov. 6, 1984

[54] FLUIDIZED CATALYTIC CRACKING PROCESS WITH LONG RESIDENCE TIME STEAM STRIPPER

[75] Inventors: Frederick J. Krambeck, Cherry Hill; Donald M. Nace, Woodbury, both of N.J.; Paul H. Schipper, Newark, Del.

[73] Assignee: Mobil Oil Corporation, New York, N.Y.

[21] Appl. No.: 543,666

[22] Filed: Oct. 19, 1983

[51] Int. Cl.$^3$ ............................................. C10G 11/02
[52] U.S. Cl. ................................... 208/120; 208/113; 502/41; 502/55
[58] Field of Search ................... 502/39, 41, 55, 517; 208/113, 120

[56] References Cited

U.S. PATENT DOCUMENTS

| | | | |
|---|---|---|---|
| 3,150,075 | 9/1964 | Russell et al. | 208/120 |
| 3,428,550 | 2/1969 | Erickson et al. | 208/120 |
| 3,433,732 | 3/1969 | Leaman | 208/111 |
| 3,791,962 | 2/1974 | Demmel et al. | 208/80 |
| 3,926,778 | 12/1975 | Owen et al. | 208/74 |
| 4,238,317 | 12/1980 | Vasalos et al. | 208/120 |
| 4,272,402 | 6/1981 | Mayes | 208/113 |
| 4,274,942 | 6/1981 | Bartholic et al. | 208/113 |
| 4,276,149 | 6/1981 | Chester et al. | 208/120 |
| 4,284,494 | 8/1981 | Bartholic et al. | 208/164 |
| 4,385,985 | 5/1983 | Gross et al. | 208/113 |

Primary Examiner—Delbert E. Gantz
Assistant Examiner—O. Chaudhuri
Attorney, Agent, or Firm—Alexander J. McKillop; Michael G. Gilman; Richard D. Stone

[57] ABSTRACT

Process for reduction of sulfur oxides emissions to the atmosphere from FCC regenerators. Spent FCC cracking catalyst containing sulfur and coke deposits is stripped at 500° to 700° C. for 1 to 10 minutes with steam to remove at least a portion of said sulfur deposits from said catalyst prior to catalyst regeneration.

9 Claims, 1 Drawing Figure

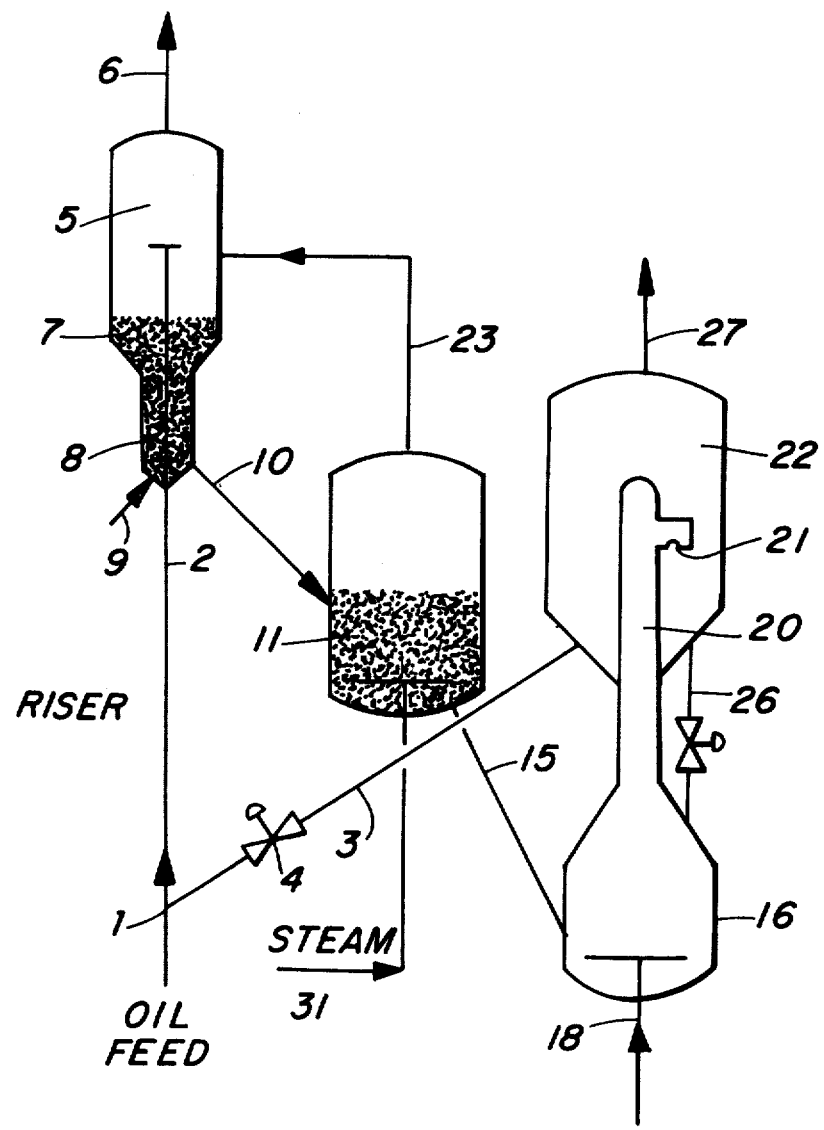

FLUIDIZED CATALYTIC CRACKING PROCESS WITH LONG RESIDENCE TIME STEAM STRIPPER

BACKGROUND OF THE INVENTION

1 Field of the Invention

This invention is concerned with a fluidized catalytic cracking process wherein coke deactivated catalyst is subjected to stripping prior to coke burnoff.

2 Description of the Prior Art

The field of catalytic cracking has undergone progressive development since 1940. The trend of development of the FCC process has been to all riser cracking, use of zeolite-containing catalyst, heat balanced operation, and complete afterburning of CO to $CO_2$ within the regenerator.

Other major trends in FCC processing have been modifications of the process to permit it to accommodate a wider range of feedstocks, in particular, stocks that contained more metals and sulfur than had previously been permitted in the feed to an FCC unit.

Along with the development of process modifications, and catalysts, which could accommodate these heavier, dirtier feeds, there has been growing concern about the amount of sulfur contained in the feed that ended up as $SO_x$ in the regenerator flue gas. Higher sulfur levels in the feed, combined with a more complete regeneration of the catalyst in the FCC regenerator, tended to increase the amount of $SO_x$ contained in the regenerator flue gas. Some attempts have been made to minimize the amount of $SO_x$ discharged to the atmosphere through the flue gas by providing agents to react with the $SO_x$ in the flue gas. These agents pass along with the regenerated catalyst back to the FCC reactor, and then the reducing atmosphere there releases the sulfur compounds as $H_2S$. Suitable agents for this purpose have been described in U.S. Pat. Nos. 4,071,436 and 3,834,031. Use of a cerium oxide agent is shown in U.S. Pat. No. 4,001,375.

Unfortunately, the conditions in most FCC regenerators are not the best $SO_x$ adsorption. The very high temperatures encountered in modern CO afterburning FCC regenerators tend to discourage $SO_x$ adsorption.

An example of a CO afterburning mode of operation using a conventional cracking catalyst to which has been added a metallic reactant which reacts with sulfur oxides is shown in U.S. Pat. No. 4,238,317, the entire contents of which are incorporated herein by reference. In this reference, metallic reactant reacts with $SO_x$ in the FCC regenerator to form stable sulfur compounds. This metallic reactant plus sulfur complex is circulated, along with the FCC catalyst, back to the FCC reactor where conventional cracking takes place. In the reducing atmosphere of the FCC reactor the metal and sulfur complex reacts to form a sulfide of the metallic reactant. The conventional FCC catalyst is withdrawn from the FCC reactor, along with the sulfide of the metallic agent and subjected to steam stripping at temperatures of 850 to 1200 F. The sulfide of the metallic agent reacts with water to form hydrogen sulfide gas and restore the metallic agent to a form in which it can react with additional sulfur oxides in the FCC regenerator.

A somewhat different approach to reducing $SO_x$ emissions from an FCC regenerator is described in U.S. Pat. No. 4,274,942, the entire contents of which is incorporated herein by reference. In this patent, spent catalyst is subjected to a partial oxidation treatment before entering the conventional CO afterburning FCC regenerator. The partial oxidation treatment, preferably conducted in the presence of steam, produces CO, $CO_2$ and some $H_2S$. Catalyst circulates from the riser reactor to a conventional stripping zone within the riser reactor to the partial oxidation zone to the conventional CO afterburning regenerator. Because some of the sulfur compounds are released, as $H_2S$, during the partial oxidation, the $H_2S$ produced never enters the regenerator and never appears as $SO_x$ in the regenerator flue gas. The environment within the partial oxidation, or sulfur rejection system, includes temperatures of 900 to 1300 F with injection of enough oxygen to combust about one third of the coke present.

A slightly different approach to removal of $SO_x$ from regenerator flue gas is shown in U.S. Pat. No. 4,284,494, the entire contents of which are incorporated herein by reference. The patentee recognized that the very hot conditions existing in a CO afterburning regenerator were not conducive to maximum absorption of sulfur oxides. In this patent, the hot flue gas was cooled, and this cooled flue gas contacted with regenerated catalyst. The regenerated catalyst adsorbs more $SO_x$ at the lower temperature than it does in the conditions existing within the FCC regenerator. Operation with an agent capable of reacting with or sorbing $SO_x$ is preferred.

Another way of minimizing $SO_x$ content in regenerator flue gas is to minimize the amount of spent catalyst, with its accompanying sulfur compounds, that enters the regenerator. Such an approach is disclosed in U.S. Pat. No. 3,926,778, the entire contents of which are incorporated herein by reference. The patentee discovered that high temperature soaking of spent catalyst alone or in combination with freshly regenerated catalyst restored enough activity to the catalyst so that it could be used for further catalytic cracking without regeneration. Catalyst flowed from the regenerator to a first riser reactor to a heat soak zone to a second riser reactor to a conventional stripping zone, and from there back to the catalyst regenerator to complete the cycle.

None of these approaches provided a completely satisfactory solution to the problem of minimizing $SO_x$ emissions from FCC regenerator flue gas. In studying the work that others had done, we discovered a way to significantly reduce $SO_x$ emissions from the flue gas, without requiring the addition of agents to adsorb $SO_x$ and without cooling the regenerator flue gas prior to contact with regnenerated catalyst. We also discovered a way to increase slightly the yield of valuable liquid products from the FCC process.

BRIEF SUMMARY OF THE INVENTION

Accordingly the present invention provides a process for catalytic cracking of a sulfur containing hydrocarbon charge by contacting said charge at cracking temperature with a circulating inventory of cracking catalyst to produce cracked vapor product and spent catalyst with deposits of coke and sulfur compounds, at least a portion of said spent catalyst is regenerated with an oxygen-containing gas at regeneration conditions including a regeneration temperature higher than said cracking temperature sufficient to burn at least a portion of said coke and said sulfur deposits to generate oxides of carbon and sulfur oxides and regenerated catalyst with reduced coke content which is recycled to contact said hydrocarbon charge, the improvement comprising subjecting said spent catalyst to contact at a temperature of 500° to 700° C. with steam for about 1 to 10 minutes, said improved process being further characterized by the absence of oxygen during said stripping and the absence of any $SO_x$ removal additives on said catalyst.

In another embodiment, the present invention provides a process for the fluidized catalytic cracking of sulfur containing hydrocarbon feed comprising passing to an FCC riser reactor said feed in contact with a zeolite catalyst on a support; separating catalyst from reactor effluent vapors; subjecting said separated catalyst to long residence time stripping at a temperature of 500° to 700° C., for 1 to 10 minutes, in the presence of a gas-comprising steam to produce stripper vapors containing at least 10 percent of the sulfur compounds deposited on said catalyst during said reaction; charging said stripped catalyst to a CO afterburning regenerator wherein said spent, stripped catalyst is contacted with an oxygen containing gas at FCC regeneration conditions sufficient to convert most of the coke deposited on said catalyst to carbon dioxide to produce a regenerated catalyst; returning said regenerated catalyst to said FCC riser reactor for reuse therein;

BRIEF DESCRIPTION OF THE DRAWING

The drawing is a simplified representation on one embodiment of the present invention showing a conventional riser reactor, a long residence time stripping zone and a conventional FCC regenerator.

DETAILED DESCRIPTION OF INVENTION

The FCC Catalyst

Any conventional FCC catalyst can be used. Use of zeolite catalysts in an amorphous base is preferred. Many suitable catalysts are discussed in U.S. Pat. No. 3,926,778, the teachings of which have been incorporated by reference.

The catalyst should not contain any metallic agents designed to adsorb or react with $SO_x$ in the FCC regenerator. It is the purpose of the present invention to avoid the necessity for inclusion of such agents with the FCC catalyst.

The FCC Reactor

Although a riser reactor is preferred as shown in the drawing, any conventional FCC reactor can be used. The FCC reactor preferably contains a conventional stripping zone in the bottom of the reactor, as shown in the drawing, or immediately outside of the reactor, as shown in U.S. Pat. No. 3,838,036, the entire contents of which are incorporated herein by reference.

The FCC Regenerator

The FCC regenerator is conventional. The regenerator can operate in a CO burning mode in a single vessel, as shown in U.S. Pat. No. 4,238,317 or a dual vessel regenerator connected by a vertical riser may be used, such as is disclosed in U.S. Pat. No. 3,926,778. Other conventional FCC regenerators include those operating in a non-afterburning mode of operation, in which coke is combusted to a mixture of CO and $CO_2$. These regenerators do not do as thorough a job regenerating the catalyst, and the $SO_x$ emission problems are somewhat less with these type regenerators, as opposed to CO afterburning regenerators, that the practice of the present invention will still be of some benefit even with these older FCC regenerators.

Long Residence Time Stripper

Any conventional catalyst gas contacting vessel which will permit contact of FCC catalyst from the reactor with a stripping gas, preferably steam, for from one half to ten minutes, preferably one to five minutes, may be used. An example of a suitable catalyst stripper is given in U.S. Pat. No. 3,728,239, the entire contents of which are incorporated herein by reference.

The stripper must be sized large enough to hold the expected flow of catalyst for a relatively long residence time within the stripper. Because of the long residence time requirement, the catalyst stripper of the present invention will be a relatively large vessel, with a catalyst inventory on the same order of magnitude as the FCC regenerator.

Preferably the long residence time stripper is placed on an elevation intermediate the catalyst withdrawal point from the reactor and the spent catalyst feedpoint to the FCC regenerator. This permits a gravity feed of catalyst from the reactor to the stripper to the regenerator. Where the present invention is incorporated into an existing FCC unit, it is possible to use a pneumatic conveyer, or other conventional means for transporting catalyst from a low point to a high point to allow all three major components, namely the reactor, stripper, and regenerator, to be at ground level.

It is also possible, and in new units may be desirable, to eliminate the conventional steam stripping section at the bottom of most FCC reactors, and simply allow the long residence time stripper of the present invention to perform essentially all of the catalyst stripping function.

Although the catalyst inventory within the long residence time stripper is relatively large, the vessel should be significantly smaller than the FCC regenerator. This is because it is possible to operate with very low vapor velocities in the long residence time stripper, promoting relatively dense bed operation, with very little disengaging space above the dense bed. Cyclones may be provided above the stripping zone dense bed, but these may be eliminated in favor of simply venting all of the gas from the long residence time stripper into the FCC reactor, or alternatively, a cyclone could be installed within the FCC reactor to help separate entrained catalysts from stripping vapors.

In another variation, the entire reactor effluent vapor may be passed through the top of the stripping zone. In this embodiment the stripping zone preferably contains secondary cyclones facilitating removal of entrained catalysts from riser reactor vapors and stripper vapors.

Preferably the weight ratio of steam to catalyst is 1:100 to 1:10.

PREFERRED EMBODIMENT

The invention will now be discussed with reference to the drawing which is a preferred embodiment of the present invention.

An oil feed is added to the base of riser reactor 2 where it is mixed with hot regenerated catalyst added via line 3 and valve 4. The catalyst and oil rise as a dilute phase mixture through riser 2 and enter separation zone 5 above the riser discharge. The riser may discharge into a cyclone, or there may be one or more cyclone separators above the riser. We prefer to quickly separate hydrocarbons from catalysts, and for this reason the riser preferably discharges directly into a cyclone, not shown in the drawing.

A dense bed of catalyst 7 forms around riser reactor 2. Catalyst passes down through a conventional stripping zone 8 and is stripped by steam added via line 9. Stripped spent catalyst is removed via line 10 and charged to long residence time stripper 11. The stripper is intermediate in elevation between the point of withdrawal of stripped spent catalyst and the bottom of catalyst regenerator 16.

Stripper vapors, comprising relatively small amounts of volatile hydrocarbons and sulfur compounds is removed from stripper 11 via line 23 and discharged into separation zone 5 in the FCC reactor. The catalyst has by now been doubly stripped, first conventionally in stripping zone 8, and then to a much greater extent in long residence time stripper 11. This doubly stripped catalyst is removed via line 15 and discharged into combustor 16. Air is added to combustor 16 via line 18. Coke on catalyst is burned in the dense phase of catalyst within catalyst 16 and also within the dilute phase transport riser 20 to which the catalyst is transported, and discharged via outlet 21 into disengaging zone 22. A dense bed of hot regenerated catalyst collects around transport riser 20 in the bottom of space 22, and from this point is returned to the reactor via line 3 or recycled via line 26 to combustor 16. Recycle of hot regenerated catalyst via line 26 helps promote rapid coke combustion and CO afterburning in combustor 16 and riser 20. Flue gas is removed from catalyst disengaging space 22 via line 27.

EXAMPLES

Feedstock

The feed was n-decane containing 8 weight percent thianaphthene. n-hexane was 99% grade obtained from The Humphrey Chemical Co. and thianaphthene was 97% grade obtained from Aldrich Chemical Co.

Catalyst

The catalyst was a commercial FCC catalyst removed from an FCC unit in an equilibrated activity state. It was completely regenerated in a muffle furnace at 1200° F. before use. Its activity level, based on the FAI catalyst activity test is 63.2 vol. % conversion with 0.44 wt % C on catalyst. The FAI catalyst activity test is defined as the conversion of a light East Texas gas oil (LETGO) at a 2 C/O, 850° F., 6 WHSV for 5 minutes on stream time to a 356° F. at 90 % ASTM gasoline product. Conversion is defined as 100%-LV% cycle oil product.

EXPERIMENTAL APPARATUS

The FCC reactor stripper and regenerator were simulated using VYCOR micro reactor. A single VYCOR micro reactor was used to simulate all three major components of the present invention, namely the FCC reactor, the long residence time stripper and the conventional regenerator.

The FCC reactor was simulated by passing the feed over the clean burned catalyst at 538° C., at atmospheric pressure for 185 seconds at a cat/oil ratio of 5.2. The resulting oil contact time was 2.9 seconds. The reactor was then flushed with cool nitrogen and very quickly cooled to a given stripping temperature. After stripping was completed, nitrogen flow was stopped and the temperature rapidly increased to 649° C. for catalyst regeneration. Catalyst regeneration was conducted by passing pure oxygen through the reactor using 325 cc of oxygen over a period of 17 minutes.

In all of the experiments, identical cracking and regeneration cycles were used, only the stream stripping conditions were changed.

Catalyst samples were taken after the coking, or FCC reactor simulation, was completed, after long residence time stripping, and after regeneration. The gases removed from the microreactor were analyzed using standard techniques so that carbon and sulfur balances could be completed.

For each experiment, there is reported the percent carbon on catalyst after stripping the amount of sulfur in the feed that remained on the catalyst both after stripping and after regeneration, and the percentage of sulfur in the charge which remained on the catalyst both after long residence time stripping and after regeneration. Also reported is the percentage of sulfur on the catalyst which was removed during catalyst regeneration as $SO_x$. The amount of sulfur in the charge stock which escapes the process as $SO_x$ emissions in the regenerator is also reported. It is the goal of the present invention to minimize the amount of sulfur in the feed that ends up as sulfur oxides in the FCC regenerator flue gas. These experimental data are collected and reported in Table 1.

TABLE 1

| Ex. | Steam Temp. (°F.) | Stripping Time (Min.) | % C On Cat. | % CO On $CO_x$ | % S Chg. on Cat. After Stripping | % S Chg. on Cat. After Regeneration | % S on Cat. Removed as $SO_x$ by Reg. | % S on Chg. Removed as $SO_x$ by Reg. |
|---|---|---|---|---|---|---|---|---|
| 1 | 1000 | 1 | 0.35 | 0.92 | 6.7 | 5.5 | 18.1 | 1.2 |
| 2 |  | 2 | 0.35 | 0.89 | 8.1 | 6.8 | 16.6 | 1.3 |
| 3 |  | 5 | 0.33 | 0.70 | 5.7 | 5.3 | 6.9 | 0.4 |
| 4 | 1350 | 0 | 0.47 | 9.79 | 10.7 | 5.1 | 52.5 | 5.6 |
| 5 |  | 1 | 0.37 | 4.63 | 8.7 | 5.3 | 39.0 | 3.4 |
| 6 |  | 2 | 0.42 | 6.28 | 7.6 | 5.5 | 27.5 | 2.1 |
| 7 |  | 5 | 0.25 | 1.82 | 6.4 | 5.3 | 17.1 | 1.1 |
| 8 | 1520 | 5 | 0.30 | 35.4 | 5.4 | 3.2 | 42.0 | 2.3 |

These data show that increased stripping time tends to reduce slightly the amount of coke remaining on the catalyst. Although the effect is slight, it means that more of the feed to the FCC unit will end up as valuable liquid product, rather than simply being burned within the FCC regenerator.

The stripping conditions have a surprising effect on the $CO/CO_2$ ratio as measured during catalyst regeneration. Lower temperature stripping and longer stripping time result in lower $CO/CO_2$ ratios in the regenerator.

With regards to sulfur removal during stripping, increased residence time significantly reduces the amount of sulfur remaining on the catalyst after stripping. It would be expected that increased residence time would increase the amount of sulfur removal, however it is surprising that sulfur is so much more readily removed from the catalyst than is coke, i.e., looking at Examples 1-3, the percent coke on catalyst decreases from 0.35 to 0.33 weight percent, while the amount of sulfur remaining on the catalyst declines from 6.7 weight percent of sulfur in charge to 5.7 weight percent.

Surprisingly, a relatively low stripping temperature produced a sulfur residue which was relatively refractory to conditions experienced in the FCC regenerator. In Example 3, less that 1 percent of the sulfur in the feed ended up as $SO_x$ emissions in the FCC regenerator. In Example 8, 2.3 percent of the sulfur in the feed ended up as $SO_x$ emissions showing that reducing the temperature of steam stripping favors a reduction in $SO_x$ emissions from the regenerator.

We do not know why low temperature steam stripping produces smaller amounts of $SO_x$ emission than does high temperature steam stripping. Had the opposite result been achieved, it would have been fairly easy to explain the lowered sulfur emissions as simply being a phenomenon of more severe stripping conditions removing more of the sulfur from the catalyst, so that there would be less sulfur on the catalyst in the regenerator. Such is not the case, however.

BEST MODE

If we were installing a long residence time sulfur stripping unit today on a unit, we would use it in conjunction with a riser reactor FCC unit operating in conjunction with a CO afterburning regenerator. We would use any of the commercially available zeolite containing catalysts, e.g., REY zeolite in a silica/alumina matrix. We would size the long residence time stripper sufficient to permit a catalyst residence time of about 5 minutes. Stripping temperature would be around 530° to 550° C. Stripped vapors from the long residence time stripper would simply be combined with the FCC reactor effluent vapor for further conventional processing.

What is claimed is:

1. In a process for catalytic cracking of a sulfur containing hydrocarbon charge by contacting said charge at cracking temperature with a circulating inventory of cracking catalyst to produce cracked vapor product and spent catalyst with deposits of coke and sulfur compounds, wherein at least a portion of said spent catalyst is regenerated with an oxygen-containing gas at regeneration conditions including a regeneration temperature higher than said cracking temperature and sufficient to burn at least a portion of said coke and said sulfur deposits to generate oxides of carbon and sulfur oxides and regenerated catalyst with reduced coke content which is recycled to contact said hydrocarbon charge, the improvement comprising subjecting said spent catalyst to stripping at a temperature of 500° to 700° C with steam for about 1 to ten minutes, said improved process being further characterized by the absence of oxygen during said stripping and the absence of any $SO_x$ removal additives on said catalyst.

2. Improved process of claim 1 wherein said steam stripping is for 1 to 5 minutes at 500° to 550° C.

3. Process of claim 1 wherein said stripping temperature is below said cracking temperature and said regeneration temperature.

4. Process of claim 1 wherein the weight ratio of steam to spent catalyst is from 1:100 to 1:10.

5. A process for the fluidized catalytic cracking of sulfur containing hydrocarbon feed comprising
   (a) passing to an FCC riser reactor said feed in contact with a zeolite catalyst on a support to produce a cracked product and spent catalyst contaminated with coke and sulphur compounds;
   (b) separating spent catalyst from reactor effluent vapors containing cracked product;
   (c) subjecting said spent catalyst to long residence time stripping at a temperature of 500 to 700 C., for 1 to 10 minutes, in the presence of a gas comprising steam to produce stripper vapors containing at least 10 percent of said sulfur compound contamination deposited on said catalyst during said riser cracking reaction and stripped catalyst;
   (d) charging said stripped catalyst to a CO afterburning regenerator wherein said spent, stripped catalyst is contacted with an oxygen containing gas at FCC regeneration conditions sufficient to convert most of said coke deposited on said catalyst to carbon dioxide to produce a regenerated catalyst;
   (e) returning said regenerated catalyst to said FCC riser reactor for reuse therein.

6. Process of claim 5 wherein long residence time stripping conditions include a temperature of 500° to 550° C., a residence time of 1 to 5 minutes, and a steam to catalyst weight ratio of 1:100 to 1:10.

7. Process of claim 5 wherein said stripping zone is a vessel separate from said FCC riser reactor and said regenerator.

8. Process of claim 5 wherein said stripping vessel is located at an elevation intermediate said FCC riser reactor and said regenerator, whereby there is a gravity flow of catalyst from said FCC riser reactor to said stripper to said regenerator.

9. Process of claim 5 wherein said stripping vessel has an upper solid-vapor disengaging space containing cyclones for separation of catalyst from stripping vapors, and wherein at least a portion of reactor effluent vapors and said stripping vapors are comingled in said stripper disengaging space, prior to entering cyclones located within said stripper.

* * * * *